(12) United States Patent
Zhan et al.

(10) Patent No.: US 12,542,125 B2
(45) Date of Patent: Feb. 3, 2026

(54) SYNTHESIS METHOD FOR EMOTION SPEECH AND SYNTHESIS APPARATUS

(71) Applicant: NetEase (Hangzhou) Network Co., Ltd., Hangzhou (CN)

(72) Inventors: Haoyue Zhan, Hangzhou (CN); Xinyuan Yu, Hangzhou (CN); Yue Lin, Hangzhou (CN)

(73) Assignee: NetEase (Hangzhou) Network Co., Ltd., Hangzhou (CN)

( * ) Notice: Subject to any disclaimer, the term of this patent is extended or adjusted under 35 U.S.C. 154(b) by 210 days.

(21) Appl. No.: 18/578,938

(22) PCT Filed: Sep. 14, 2022

(86) PCT No.: PCT/CN2022/118765
§ 371 (c)(1),
(2) Date: Jan. 12, 2024

(87) PCT Pub. No.: WO2023/221345
PCT Pub. Date: Nov. 23, 2023

(65) Prior Publication Data
US 2024/0321259 A1 Sep. 26, 2024

(30) Foreign Application Priority Data
May 16, 2022 (CN) .......................... 202210529681.5

(51) Int. Cl.
G10L 13/02 (2013.01)
G10L 13/08 (2013.01)
(52) U.S. Cl.
CPC .............. G10L 13/02 (2013.01); G10L 13/08 (2013.01)

(58) Field of Classification Search
CPC ..... G10L 13/02; G10L 13/08; G10L 13/0335; G10L 13/033; G10L 13/047; G10L 2013/105; G10L 13/10
See application file for complete search history.

(56) References Cited

U.S. PATENT DOCUMENTS 11,232,780 B1 * 1/2022 Iyer ........................ G10L 13/027
2011/0202345 A1 * 8/2011 Meyer ..................... G10L 13/02
704/E13.011
(Continued)

FOREIGN PATENT DOCUMENTS

CN 111128118 A 5/2020
CN 12309365 A 2/2021
(Continued)

OTHER PUBLICATIONS

English Abstract of cited patent documents.
(Continued)

Primary Examiner — Huyen X Vo
(74) Attorney, Agent, or Firm — Greenberg Traurig, LLP; Jennifer Brooks; Jonathan Lee

(57) ABSTRACT

A synthesis method for emotion speech and a synthesis apparatus are provided; the synthesis method includes: determining, by a terminal, an original text, a target emotion, a target timbre, and an emotion timbre corresponding to a to-be-synthesized emotion speech; splitting the original text to obtain a plurality of target syllables constituting the original text; performing mapping on each of the plurality of target syllables based on the target emotion and the emotion timbre to obtain a phonetics speech feature sequence of each target syllable; integrating, by the terminal, the phonetics speech feature sequence of each of the target syllables to obtain a speech feature corresponding to the original text;
(Continued)

and synthesizing, by the terminal, the target emotion speech, by using the speech feature and the target timbre.

20 Claims, 3 Drawing Sheets

(56) References Cited

U.S. PATENT DOCUMENTS

| | | |
|---|---|---|
| 2019/0172443 A1 | 6/2019 | Shechtman et al. |
| 2020/0394998 A1* | 12/2020 | Kim .................... G06N 3/0455 |
| 2021/0097976 A1* | 4/2021 | Chicote ................ G06N 3/0442 |

FOREIGN PATENT DOCUMENTS

| | | |
|---|---|---|
| CN | 113327580 A | 8/2021 |
| CN | 114242033 A | 3/2022 |
| CN | 114927122 A | 8/2022 |

OTHER PUBLICATIONS

English translation of ISR of WO2023221345.
English translation of Written Opinion of the International Searching Authority of PCTCN2022118765.
International Search Report of WO2023221345.
Written Opinion of the International Searching Authority of PCTCN2022118765.

* cited by examiner

SYNTHESIS METHOD FOR EMOTION SPEECH AND SYNTHESIS APPARATUS

CROSS-REFERENCE TO RELATED APPLICATIONS

The present disclosure is the U.S. National Stage Application of PCT International Application No. PCT/CN2022/118765, filed on Sep. 14, 2022, which is based upon and claims priority to the Chinese Patent Application No. 202210529681.5 filed on May 16, 2022 and entitled "Synthesis Method for Emotion Speech and Synthesis Apparatus", the entire contents of both of which are incorporated herein by reference by reference for all purposes.

TECHNICAL FIELD

The present disclosure relates to the field of speech synthesis technologies, and particularly to a synthesis method for emotion speech and a synthesis apparatus.

BACKGROUND

In recent years, with a rapid development of machine learning, especially related technical research in the deep learning field, there have been changes in interaction modes between humans and computers, with a corresponding increase in related commercial products. As a novel mode of interaction between humans and computers, speech interaction not only brings brand-new user experiences, but also expands design possibilities and application scenarios of various products. A speech synthesis system is one of core systems of a speech interaction closed loop, and how to synthesize a multi-timbre and multi-emotion speech is an important research topic in the field of speech synthesis.

In a related art, during synthesis of the multi-timbre and multi-emotion speech, speech data of different emotions of each timbre must be collected, which greatly increases a construction cost of the speech synthesis system. Likewise, an emotion expression capability of a speaker with the corresponding timbre also influences quality of the synthesized speech.

SUMMARY

The present disclosure provides a synthesis method for emotion speech and a synthesis apparatus.

In some aspects, the present disclosure provides a synthesis method for emotion speech, including: determining, by a terminal, an original text, a target emotion, a target timbre, and an emotion timbre corresponding to a to-be-synthesized emotion speech; splitting the original text to obtain a collection of target syllables constituting the original text; performing mapping on each of the collection of target syllables based on the target emotion and the emotion timbre to obtain a speech feature sequence of each target syllable, where the speech feature sequence includes at least one of a pronunciation duration, a pitch, or an energy; integrating, by the terminal, the speech feature sequence of each of the collection of target syllables to obtain a speech feature corresponding to the original text; and synthesizing, by the terminal, the target emotion speech corresponding to the original text and having the target emotion and the target timbre, by using the speech feature of the original text and the target timbre.

In some aspects, the present disclosure further provides an electronic device, including: a processor, a memory, and a bus, where the memory stores machine-readable instructions executable by the processor, where when the electronic device is running, the processor and the memory communicate with each other via the bus, and the machine-readable instructions, when executed by the processor, performs steps of a synthesis method, with the synthesis method including: determining an original text, a target emotion, a target timbre, and an emotion timbre corresponding to a to-be-synthesized emotion speech; splitting the original text to obtain a collection of target syllables constituting the original text; performing mapping on each of the collection of target syllables based on the target emotion and the emotion timbre, so as to obtain a speech feature sequence of each target syllable, where the speech feature sequence includes at least one of a pronunciation duration, a pitch, or an energy; integrating the speech feature sequence of each of the collection of target syllables, so as to obtain a speech feature corresponding to the original text; and synthesizing the target emotion speech corresponding to the original text and having the target emotion and the target timbre, by using the speech feature of the original text and the target timbre.

In some aspects, the present disclosure further provides a non-transitory computer-readable storage medium, storing a computer program thereon, where the computer program, when executed by a processor, performs steps of a synthesis method, with the synthesis method including: determining an original text, a target emotion, a target timbre, and an emotion timbre corresponding to a to-be-synthesized emotion speech; splitting the original text to obtain a collection of target syllables constituting the original text; performing mapping on each of the target syllables based on the target emotion and the emotion timbre, so as to obtain a speech feature sequence of each target syllable, where the speech feature sequence includes at least one of a pronunciation duration, a pitch, or an energy; integrating the speech feature sequence of each of the target syllables, so as to obtain a speech feature corresponding to the original text; and synthesizing the target emotion speech corresponding to the original text and having the target emotion and the target timbre, by using the speech feature of the original text and the target timbre.

BRIEF DESCRIPTION OF DRAWINGS

To describe the embodiments of the present invention more clearly, the following briefly describes the accompanying drawings required in the embodiments. It should be understood that the following accompanying drawings show merely some embodiments of the present invention and therefore should not be considered as limiting the scope, and a person of ordinary skill in the art may still derive other related drawings from these accompanying drawings without creative efforts.

DETAILED DESCRIPTION

Figure 1:
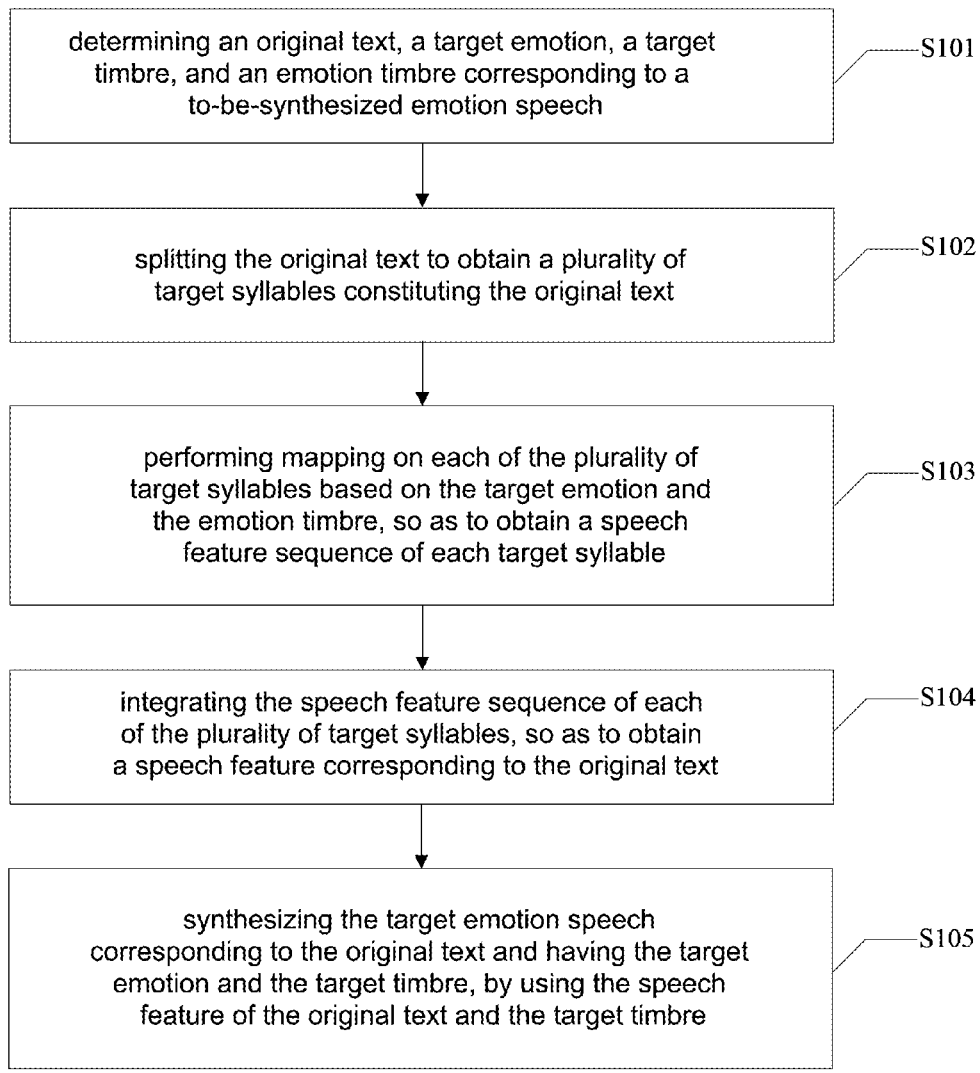
FIG. 1 shows a flow chart of a synthesis method for emotion speech according to an embodiment of the present disclosure.

To make the objectives, examples and advantages of the embodiments of the present disclosure clearer, the examples in the embodiments of the present disclosure are clearly and completely described in conjunction with the accompanying drawings in the embodiments of the present disclosure, and apparently, the described embodiments are not all but only a part of the embodiments of the present disclosure. Generally, the assemblies of the embodiments of the present invention described and illustrated in the drawings herein may be arranged and designed in a variety of different configurations. Accordingly, the following detailed description of the embodiments of the present invention provided in the drawings is not intended to limit the scope of protection of the present invention, but only represents selected embodiments of the present invention. All other embodiments obtained by those skilled in the art based on the embodiments of the present disclosure without creative efforts shall fall within the protection scope of the present disclosure.

First, an application scenario to which the present disclosure is applicable will be described. The present disclosure can be applied to the field of speech synthesis technologies.

Research shows that according to traditional methods, an emotion speech is computer-synthesized mainly by the following ways.

First, a single-timbre multi-emotion speech synthesis system is constructed. That is, speech data of different emotions of a target speaker is collected to construct a library of recorded speech that can be used to develop a speech synthesis system.

Second, a small amount of speech data of different emotions of a target speaker is collected to construct a speech conversion system, and a speech with a neutral emotion of a target timbre is converted into a speech with other emotion types, such that a multi-emotion speech synthesis system is realized.

However, when the emotion speech is synthesized using the above two ways, if a multi-timbre emotion speech is desired to be synthesized, speech data of various emotions of a target timbre is required to be collected for each target timbre that can be synthesized; that is, multi-emotion speech data is collected for each target speaker. Obviously, in such a way, a data collection cost and difficulty is greatly increased, and an emotion expression capability of the speaker being recorded may also influence quality of the speech synthesized by the emotion speech synthesis system.

Third, speech data of different emotions of the same speaker is collected to construct an emotion recognition model, speech data of plural speakers is collected to construct a multi-speaker speech synthesis machine learning model, and an emotion feature is extracted by using a pre-trained emotion recognition machine learning model which can then be added into the multi-speaker speech synthesis model for transfer learning so as to obtain a multi-speaker emotion speech synthesis model. However, a staged training is required in the system, and complexity and difficulty of system construction are greatly increased by the emotion recognition model and multi-stage transfer learning; meanwhile, since different types of data sets are used for two stages of training, the quality of the synthesized speech is also affected.

Fourth, speech data of different emotions of the same speaker is collected to construct the emotion recognition model, speech data of plural speakers is collected to construct the multi-speaker speech synthesis model, the pre-trained emotion recognition model is used as a discriminator, and a speech synthesis model for various emotions of each target speaker is obtained based on an adversarial training technology. However, in the system, separate models are required for different emotions, and the universality is poor; the complexity difficulty of system construction is also increased by the multi-stage training mode, and different types of data sets are required in different training stages, which further affect the quality of the synthesized speech.

According to traditional methods, during synthesis of the multi-timbre and multi-emotion speech, data collection cost and difficulty are high, the speech synthesis system is complex to construct, and different types of sample data are used in various training stages so that the synthesized speech quality is negatively affected.

Based on this, embodiments of the present disclosure provide a synthesis method for emotion speech and a synthesis apparatus, with which a speech feature of an original text can be determined according to a target emotion and an emotion timbre, and a target emotion speech can be synthesized based on the speech feature of the original text and the target timbre; in this way, when speeches with different target timbres and different target emotions are to be synthesized, it is not necessary to collect speech data of different target emotions for each target timbre, and only speech data of different target emotions for one or a few timbres is required to be collected, thus reducing a cost of emotion speech synthesis, reducing an influence of an emotion expression capability of a speaker with a corresponding timbre on speech quality, and improving service experiences of speech interaction.

Reference will now be described in detail to examples, which are illustrated in the accompanying drawings. The following description refers to the accompanying drawings in which the same numbers in different drawings represent the same or similar elements unless otherwise represented. The examples described following do not represent all examples consistent with the present disclosure. Instead, they are merely examples of devices and methods consistent with aspects of the disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

The term "computer-readable storage medium," as used herein, can generally refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A terminal, as described herein, generally represents any type or form of computing device capable of reading computer-executable instructions. For example, a terminal may represent an endpoint computing device, such as a personal computing device operated by a user. Examples of a terminal may include, without limitation, a laptop, a desktop, a mobile phone, a wearable device, a smart device, an artificial reality device, a personal digital assistant (PDA), etc Please refer to FIG. 1 which is a flow chart of a synthesis method for emotion speech according to an embodiment of the present disclosure. As shown in FIG. 1, the synthesis method for emotion speech according to the embodiment of the present disclosure includes:

S101: determining an original text, a target emotion, a target timbre, and an emotion timbre corresponding to a to-be-synthesized emotion speech;

S102: splitting the original text to obtain a plurality of target syllables constituting the original text;

S103: performing mapping on each of the plurality of target syllables based on the target emotion and the emotion timbre, so as to obtain a speech feature sequence of each target syllable, with the speech feature sequence including at least one of a pronunciation duration, a pitch, or an energy;

S104: integrating the speech feature sequence of each of the plurality of target syllables, so as to obtain a speech feature corresponding to the original text; and S105: synthesizing the target emotion speech corresponding to the original text and having the target emotion and the target timbre, by using the speech feature of the original text and the target timbre.

With the synthesis method for emotion speech according to the embodiment of the present disclosure, the speech feature of the original text can be determined according to the target emotion and the emotion timbre, and the target emotion speech can be synthesized based on the speech feature of the original text and the target timbre; in this way, when the speeches with different target timbres and different target emotions are required to be synthesized, it is not necessary to collect the speech data of different target emotions for each target timbre, and only the speech data of different target emotions for one or a few timbres is required to be collected, thus reducing the cost of the emotion speech synthesis, reducing the influence of the emotion expression capability of the speaker with the corresponding timbre on the speech quality, and improving the service experiences of the speech interaction.

An implementation process of each step is detailed below in conjunction with specific examples.

In some examples according to the present disclosure, step S101 may additionally include steps of:

S1011: in response to an emotion speech synthesis instruction, acquire the original text, the target emotion and the target timbre corresponding to the to-be-synthesized emotion speech.

Herein, the emotion speech synthesis instruction may be triggered by a user, or automatically generated by a preset program, which is not limited in the present disclosure.

Taking user triggering as an example, the original text, the target emotion, and the target timbre corresponding to the to-be-synthesized emotion speech can be acquired in response to the emotion speech synthesis instruction triggered by the user. Herein, the original text refers to a text for indicating semantic content of the to-be-synthesized speech; the target emotion refers to an emotion expected to be possessed by the to-be-synthesized speech, and the emotion may be nature, anger, sadness, joy, or the like; the target timbre refers to a timbre expected to be possessed by the to-be-synthesized speech, where different speakers have different timbres, and the timbre can reflect a unique character of the speech, and thus an identity of a speaker can be distinguished; the timbre may correspond to speaker A, speaker B, speaker C, or the like.

Here, for the way of acquiring, the original text may be input by the user in a page, selected by the user in a preset text library, or recognized from a speech input by the user, and the acquiring way of the original text is not limited in the present disclosure.

S1012: searching a predetermined emotion speech library, and when the target emotion corresponds to one timbre, determining the corresponding timbre as the emotion timbre.

Herein, the synthesis method for emotion speech according to the embodiment of the present disclosure can be implemented by a synthesis system for emotion speech. The predetermined emotion speech library is a speech library composed of a collection of sample speeches required for constructing the synthesis system or obtaining the synthesis method.

It should be noted that in the related art, in order to construct a speech synthesis system capable of synthesizing plural timbres and plural emotions, for each target timbre which can be synthesized by the synthesis system, sample speech data of different emotions of the target timbre is required to be acquired; that is, for the target speaker corresponding to each target timbre, speech data of various emotions expressed by the target speaker is required to be collected, which greatly increases a cost and difficulty of construction of the synthesis system, and meanwhile, an emotion deduction capability of the target speaker greatly restricts the quality of the synthesized speech.

In the synthesis method for emotion speech according to the embodiment of the present disclosure, for each target timbre capable of being synthesized, the sample speech data of different emotions of the target timbre is not required to be collected, and only sample speech data of natural reading of the target timbre and emotion speech data of one or more timbres are required to be collected; that is, for emotion speech data, in the synthesis method according to the embodiment of the present disclosure, only speech data of emotions expressed by one or a few speakers is required to be collected; obviously, the cost and difficulty of construction of the synthesis system are greatly reduced. Furthermore, the collected emotion speech data is not limited to be provided by the target speaker (corresponding to the target timbre capable of being synthesized by the synthesis system), such that a speaker with a better emotion expression capability can be selected to provide the emotion speech, such as a professional announcer, thereby improving the synthesis quality of the emotion speech and service experiences of speech interaction.

In one example, the predetermined emotion speech library includes a collection of sample speeches, and each sample speech has an emotion mark and a timbre mark, where the emotion mark indicates the emotion of the sample speech, and the timbre mark indicates the timbre of the sample speech. In this way, each emotion in the predetermined emotion speech library has a corresponding timbre.

Therefore, when the target emotion corresponds to one timbre, the corresponding timbre can be directly determined as the emotion timbre.

S1013: when the target emotion corresponds to a collection of timbres, performing semantic analysis on the original text by using a natural language processing technology, so as to determine an emotion intensity of an emotion contained in the original text.

In this step, when the target emotion corresponds to a collection of timbres, semantic analysis is performed on the original text by using the natural language processing technology, so as to determine the emotion intensity of the emotion embodied in the original text, i.e., an intense degree of the emotion. It should be understood that the text and the speech corresponding to the same emotion are different when the emotion intensity is different. Taking the emotion "sadness" as an example, at a low emotion intensity, the emotion speech may be embodied as sobbing-speaking; at a high emotion intensity, the emotion speech may be embodied as loud-cry-speaking, and at this point, more words expressing a strong emotion, or the like, may appear in the text.

S1014: screening out the timbre coincident with the emotion intensity from the collection of timbres corresponding to the target emotion, and taking the timbre coincident with the emotion intensity as the emotion timbre.

Further, the timbre coincident with the emotion intensity is screened out from the collection of timbres corresponding to the target emotion, and the timbre coincident with the emotion intensity is taken as the emotion timbre. In this way, the intensity of the target emotion in the synthesized speech is coincident with the emotion intensity embodied by the original text, thus further improving the quality of the synthesized speech.

In the above, timbre being coincident with the emotion intensity means that in the collection of sample speeches included in the predetermined emotion speech library, the intensity of the target emotion contained in at least one sample speech corresponding to the timbre and having the target emotion is coincident with the emotion intensity.

Here, when the target emotion corresponds to a collection of timbres in the predetermined emotion speech library, for each timbre, the predetermined emotion speech library includes at least one sample speech corresponding to the timbre and having the target emotion; when the predetermined emotion speech library is constructed, the intensity of the target emotion contained in the at least one sample speech corresponding to the timbre and having the target emotion can be determined by performing speech analysis, manual marking, or the like, on the sample speech.

Further, the timbre and the intensity of the target emotion corresponding to the timbre can be bound, such that after the target emotion is determined, the timbre which is coincident with the emotion intensity can be screened out from the collection of timbres corresponding to the target emotion.

In an example according to the present disclosure, target emotion "sadness" is determined to correspond to three timbres "speaker A", "speaker B" and "speaker C" by searching the predetermined emotion speech library; for the type of emotion "sadness", the intensities of emotion "sadness" bound to "speaker A", "speaker B" and "speaker C" are "strong", "medium" and "weak" sequentially; semantic analysis is performed on the original text by using the natural language processing technology, the emotion intensity of the emotion contained in the original text is determined to be "weak", and at this point, timbre "speaker C" can be determined to be coincident with the emotion intensity, and is then used as the emotion timbre.

In some examples according to the present disclosure, when the target emotion corresponds to a collection of timbres, by providing the collection of timbres corresponding to the target emotion to a user for selection, the emotion timbre is determined in response to a selection operation of the user.

In some examples according to the present disclosure, the step S102 of splitting the original text to obtain a collection of target syllables constituting the original text may be implemented by presetting a dictionary.

In one or more examples of the present disclosure, a character/word in the text is pronounced in units of syllables; for example, Chinese character "ni" is consisted of two syllables "n" and "i". In this step, the original text can be split into a collection of syllables by means of a dictionary; in order to facilitate processing and computer recognition in subsequent steps, the target syllables may be represented in the form of a numerical sequence based on an order of the syllables in the dictionary. In this way, the original text is split into a collection of target syllables, each target syllable is represented by one or more numerical codes, and the original text is represented by a numerical sequence.

Furthermore, it should be noted that the language of the original text may be Chinese, English, Japanese, or the like, and the original text may also be a mixed text composed of plural languages; besides characters/words, the original text may contain numbers and special symbols, which may also be split into syllables and converted into a numerical sequence by means of dictionary, and the present disclosure does not make any limitation on the language and content of the text.

In some examples according to the present disclosure, step S103 may include the a step of:

determining the speech feature sequence of each of the collection of target syllables mapped under the target emotion and the emotion timbre, based on a preset mapping relationship table.

The mapping relationship table is configured for representing a mapping relationship of syllables to the speech feature sequence under different emotions and different timbres. In one or more examples of the present disclosure, the mapping relationship table may be implemented by means of machine learning, such as a convolutional neural network (CNN) and a long-short term memory network (LSTM).

In an example, the mapping relationship table is determined by steps of:

step 1: acquiring a collection of sample speeches.

Herein, each sample speech is marked with an emotion mark and a timbre mark, each sample speech has a corresponding sample text, and each sample text is split into a collection of sample syllables.

It should be noted that, as described above, in the synthesis method for emotion speech according to the embodiment of the present disclosure, for each target timbre capable of being synthesized, only a sample speech of natural reading of the target timbre and an emotion speech of one or several timbres are required to be collected. Therefore, the collection of sample speeches obtained from a sample speech set include both emotion speeches and non-emotion speeches (natural reading speeches). Herein, the non-emotion speech also has a corresponding emotion mark; for example, the emotion mark of the non-emotion speech may be 0.

When the mapping relationship table is implemented by means of machine learning, a network model can be trained by using the sample speech, such that the network model learns the mapping relationship between syllables and speech feature sequences under different emotions and different timbres. Thus, when the network model is trained, in the synthesis method according to the present disclosure, the emotion speech and the non-emotion speech in the sample speech can be used for joint training, thus further reducing complexity of model training, and reducing an influence of data classification training on the quality of the synthesized speech.

Step 2: for each of the collection of sample speeches, determining a spectrum feature of each speech frame in the sample speech, and a collection of sample syllables split from a sample text corresponding to the sample speech.

Firstly, it should be noted that a collection of speech time sequence sample points can be obtained by sampling a continuous original speech signal according to a certain sampling frequency, and the collection of speech time sequence sample points constitute the sample speech; the sample speech is framed to obtain a collection of speech frames of the sample speech, and the duration of each of the speech frames is the same.

In this step, for each sample speech, the spectrum feature of each speech frame of the sample speech is determined; herein, the spectrum feature includes a Mel-spectrum feature, a Mel cepstral coefficient feature, or the like. In one or more examples of the present disclosure, a linear spectrum of the sample speech can be obtained by performing short-time Fourier transform on each speech frame of the sample speech; and then, the linear spectrum passes through a Mel filter to obtain the Mel-spectrum feature of each speech frame, or the linear spectrum passes through an Fbank filter and then is subjected to a discrete cosine change to obtain the Mel cepstrum coefficient feature of each speech frame. Besides the above-mentioned manner of extracting the spectrum feature, this step can also be implemented by means of machine learning, such as an unsupervised neural network, a pre-trained network model, or the like, which is not limited here by the present disclosure.

Step 3: aligning the speech frames and the sample syllables, from a first speech frame of the sample speech and a first sample syllable corresponding to the sample speech, according to the spectrum features of the speech frames, so as to determine one or more speech frames corresponding to each sample syllable.

For the first sample syllable, sequential alignment is performed backwards with the first speech frame as a starting point, until an ending speech frame corresponding to the first sample syllable is determined according to the spectrum feature of the speech frame, and the speech frames between the first speech frame and the ending speech frame are determined as the speech frames corresponding to the first sample syllable; and then, for a second sample syllable, the above-mentioned steps are repeated with a next speech frame of the ending speech frame as a starting point, until one or more speech frames corresponding to each sample syllable are determined.

Step 4: for each sample syllable, determining pronunciation duration of the sample syllable based on the one or more speech frames corresponding to the sample syllable.

In this step, since duration of the speech frames is consistent (for example, the duration of each speech frame is 10 milliseconds), the pronunciation duration of the sample syllable may be determined based on a number and the duration of the speech frames corresponding to the sample syllable; a certain sample syllable corresponds to a third speech frame to a fifth speech frame, the pronunciation duration of each speech frame is 10 milliseconds, and the pronunciation duration of the sample syllable is 30 milliseconds.

Step 5: determining a pitch and energy of the sample syllable according to an audio algorithm, based on the spectrum features of the one or more speech frames corresponding to the sample syllable.

In this step, the pitch and the energy of each speech frame can be calculated based on the spectrum feature of the speech frame according to the audio algorithm, such as a WORLD algorithm; and then, the pitches and the energy of the one or more speech frames corresponding to the sample syllable are averaged respectively, so as to obtain the pitch and the energy of the sample syllable.

In some examples according to the present disclosure, determination of the pitch of the sample syllable in step 5 may further be implemented by steps of:

step (A): for each of the collection of sample speeches, screening out at least one target sample speech with the same timbre mark as the sample speech, from the collection of sample speeches; with the at least one target sample speech including the sample speech.

In this step, for each of the collection of sample speeches, at least one target sample speech is screened out from the collection of sample speeches according to the timbre mark of the sample speech, such that the timbre marks of the target sample speeches are the same; with the target sample speech also including the sample speech.

Step (B): determining an original pitch of each speech frame of each of the at least one target sample speech according to an audio algorithm, based on the spectrum feature of the speech frame.

Here, same as step 5, the original pitch of each speech frame can be calculated based on the spectrum feature of the speech frame according to the audio algorithm, such as the WORLD algorithm.

Step (C): determining statistical data of an original pitch corresponding to the timbre mark of each target sample speech, based on the original pitch of each speech frame of the sample speech.

In this step, a common statistical calculation formula may be adopted to calculate the statistical data of the original pitch according to the original pitch of each speech frame of each of the at least one target sample speech. The target sample speech is screened out from the collection of sample speeches according to the timbre mark; that is, the target sample speeches have the same timbre mark, such that the calculated statistical data of the original pitch corresponds to the timbre mark.

Step (D): normalizing an initial pitch of each speech frame of the sample speech, based on the statistical data of the original pitch, so as to obtain a pitch of each speech frame of the sample speech.

Herein, the statistical data of the original pitch may include an average value, a standard deviation, or the like, of the original pitch. When the statistical data is the average value of the original pitch, a way of normalizing the original pitch of each speech frame of the sample speech includes: pitch of speech frame=(original pitch of speech frame−average value of original pitch)/average value of original pitch; when the statistical data is the average value and the standard deviation of the original pitch, the way of normalizing the original pitch of each speech frame of the sample speech includes: pitch of speech frame=(original pitch of speech frame−average value of original pitch)/standard deviation of original pitch.

In this way, the pitch of the sample syllable is normalized according to the timbre mark corresponding to the sample syllable, timbre information introduced by the timbre mark in the pitch can be removed, and the timbre of the subsequently synthesized target emotion speech is guaranteed to be consistent with the target timbre.

Step (E): for each sample syllable corresponding to the sample speech, determining an average value of the pitches of the one or more speech frames corresponding to the sample syllable, and determining the average value as the pitch of the sample syllable.

Step 6: determining the pronunciation duration, the pitch, and the energy corresponding to the sample syllable as a speech feature sequence of the sample syllable.

Step 7: constructing the mapping relationship table for representing mapping relationships between syllables and the speech feature sequences under different emotions and different timbres, according to the speech feature sequence of each sample syllable in each sample speech, as well as the emotion mark and the timbre mark of each sample speech.

When the mapping relationship table is implemented by means of machine learning, during training of a model, for each sample syllable in each sample speech, the sample syllable as well as the emotion mark and the timbre mark of the sample speech can be used as input of the model, and the speech feature sequence of the sample syllable is used as expected output of the model, such that the model learns the mapping relationship between the syllable and the speech feature sequence under different emotions and different timbres. Therefore, during application, the trained model can determine the speech feature sequence mapped by each target syllable based on the input target syllable, target emotion and emotion timbre.

In some examples according to the present disclosure, step S104 may include a step of:

S1041: for each target syllable, inputting the target syllable, the target emotion, and the speech feature sequence of the target syllable into a pre-trained speech feature processing model for feature fusion, so as to obtain a fusion speech feature of the target syllable.

In an example, the speech feature processing model may include various network models, such as a CNN model, an LSTM model, or the like. For each target syllable, the speech feature processing model maps the input target syllable, the target emotion, and items in the speech feature sequence of the target syllable to a same feature dimension, and adds a feature vector of the target syllable, a feature vector of the target emotion, and feature vectors of the items in the speech feature sequence of the target syllable obtained after mapping to the same dimension for feature fusion, thereby obtaining the fusion speech feature of the target syllable. The target syllable, the target emotion, and the items in the speech feature sequence of the target syllable may be mapped into 256-dimensional feature vectors respectively, and then, vector addition is performed to obtain a 256-dimensional fusion speech feature.

In this way, through mapping the target syllable, the target emotion, and the items in the speech feature sequence of the target syllable to the same feature dimension and then performing addition by the speech feature processing model, the fusion speech feature may include integrated information including syllable information, emotion information, and the speech feature sequence, and preparation is made for subsequent speech synthesis.

S1042: determining a number of replications of the fusion speech feature of the target syllable according to the pronunciation duration of the target syllable, and replicate the fusion speech feature of the target syllable according to the number of replications, so as to obtain an intermediate speech feature of the target syllable.

In this step, the number of replications is determined according to the pronunciation duration, and the intermediate speech feature is obtained after the comprehensive feature is replicated, such that the target syllable synthesized based on the intermediate speech feature can have accurate pronunciation duration. For example, if the pronunciation duration of a target syllable should be 30 milliseconds, the number of replications may be determined to be 3, the comprehensive feature of the target syllable is replicated three times, and a length of the comprehensive feature is extended by three times, so as to obtain the intermediate speech feature of the target syllable, such that the pronunciation duration of the target syllable in the synthesized actual target emotion speech can be coincident with expected duration.

S1043: integrating the intermediate speech feature of each target syllable of the original text, so as to obtain the speech feature corresponding to the original text.

Here, since the text is pronounced in units of syllables, the speech feature corresponding to the original text can be obtained by sequentially integrating the intermediate feature of each target syllable of the original text.

In some examples according to the present disclosure, the speech feature processing model is trained by steps of:

step 1: for the sample syllable corresponding to each of the collection of sample speeches, inputting the sample syllable, the emotion mark and the timbre mark of the sample speech and the speech feature sequence of the sample syllable into an initial speech feature processing model, so as to obtain a fusion speech feature of the sample syllable.

Herein, model parameters of the pre-constructed initial speech feature processing model can be randomly set, and the trained speech feature processing model can be obtained by gradually adjusting the model parameters of the initial speech feature processing model in the subsequent training process.

Similarly, in the process of training the speech feature processing model, the emotion speech and the non-emotion speech in the sample speech are also used for joint training, thus further reducing complexity of model training, and reducing the influence of data classification training on the quality of the synthesized speech.

Step 2: determining a number of replication multiple of the fusion speech feature of the sample syllable according to the pronunciation duration of the sample syllable, and replicating the fusion speech feature of the sample syllable according to the replication multiple, so as to obtain an intermediate speech feature of the sample syllable.

Step 3: integrating the intermediate speech feature of each sample syllable corresponding to the sample speech, so as to obtain the speech feature of the sample text corresponding to the sample speech.

Here, for description of step 1 to step 3, reference may be made to the description of S1041 to S1043, same technical effects may be achieved, and details are not repeated.

Step 4: performing timbre recognition on the speech feature of the sample text corresponding to the sample speech, and determining a timbre recognition result of the speech feature of the sample text corresponding to the sample speech.

In this step, a timbre recognition may be performed on the speech feature of the sample text corresponding to the sample speech by a pre-constructed timbre recognition model, and the timbre recognition result of the speech feature is determined.

Step 5: adjusting model parameters of the initial speech feature processing model according to the determined timbre recognition result and the timbre mark of the sample speech, re-obtaining a speech feature of the sample text corresponding to the sample speech based on the initial speech feature processing model after parameter adjustment, and determining a timbre recognition result of the re-obtained speech feature.

In this step, a gradient of the model parameters in the initial speech feature processing model can be determined according to the timbre recognition result and the timbre mark of the sample speech; the gradient of the model parameters are inverted, and then, the inverted gradient is back-propagated to update the model parameters of the initial speech feature processing model.

Further, the speech feature can be obtained again in the way of step 1 to step 3 according to the initial speech feature processing model after the parameters are adjusted; then the timbre recognition result of the speech feature is determined again in the way of step 4.

Step 6: repeating the above-mentioned step 5 until the determined timbre recognition result of the speech feature of the sample text corresponding to the sample speech is not coincident with the timbre mark, and obtaining the speech feature processing model.

The speech feature processing model is trained in this way, such that the timbre recognition result of the speech feature obtained by the trained speech feature processing model cannot be recognized to be coincident with the timbre mark, and accuracy of the timbre recognition result is as low as possible, which indicates that the timbre information introduced by the emotion timbre in the speech feature is removed, and the emotion feature in the speech feature is reserved, thus improving the speech quality of the subsequently synthesized target emotion speech, and ensuring that the timbre of the target emotion speech is consistent with the target timbre.

In some examples according to the present disclosure, in step S105, the target emotion speech corresponding to the original text and having the target emotion and the target timbre may be synthesized by inputting the speech feature of the original text and the target timbre into the speech synthesis model. In an example, this step may be implemented by way of a multilayer CNN, a recurrent neural network (RNN), or the like.

The synthesis method for emotion speech according to the embodiment of the present disclosure includes: determining the original text, the target emotion, the target timbre, and the emotion timbre corresponding to the to-be-synthesized emotion speech; splitting the original text to obtain the collection of target syllables constituting the original text; performing mapping on each of the collection of target syllables based on the target emotion and the emotion timbre, so as to obtain the speech feature sequence of each target syllable, with the speech feature sequence including at least one of the pronunciation duration, the pitch, or the energy; integrating the speech feature sequence of each of the collection of target syllables, so as to obtain the speech feature corresponding to the original text; and synthesizing the target emotion speech corresponding to the original text and having the target emotion and the target timbre, by utilizing the speech feature of the original text and the target timbre.

With the synthesis method, the speech feature of the original text can be determined according to the target emotion and the emotion timbre, and the target emotion speech can be synthesized based on the speech feature of the original text and the target timbre; in this way, when the speeches with different target timbres and different target emotions are required to be synthesized, it is not necessary to collect the speech data of different target emotions for each target timbre, and only the speech data of different target emotions for one or a few timbres is required to be collected, thus reducing the cost of the emotion speech synthesis, reducing the influence of the emotion expression capability of the speaker with the corresponding timbre on the speech quality, and improving the service experiences of the speech interaction.

Figure 2:
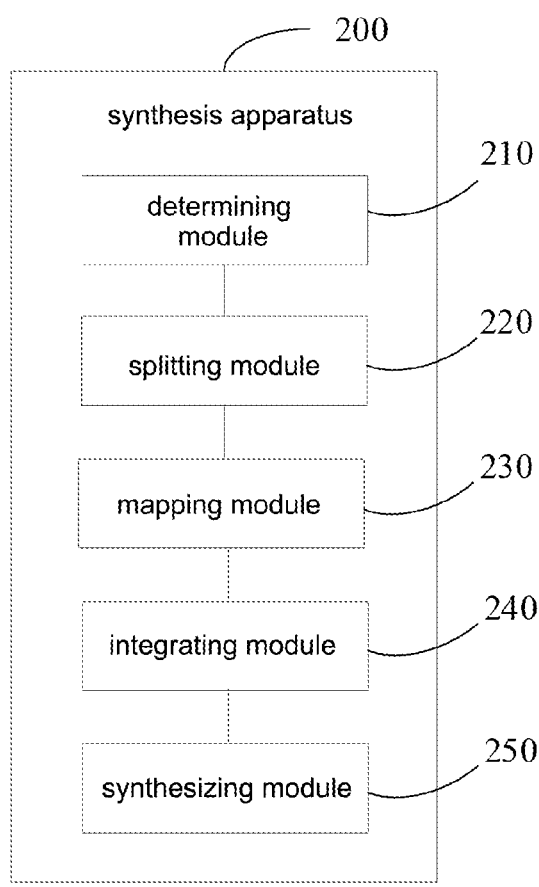
FIG. 2 shows a schematic structural diagram of a synthesis apparatus for emotion speech according to an embodiment of the present disclosure.
Figure 3:
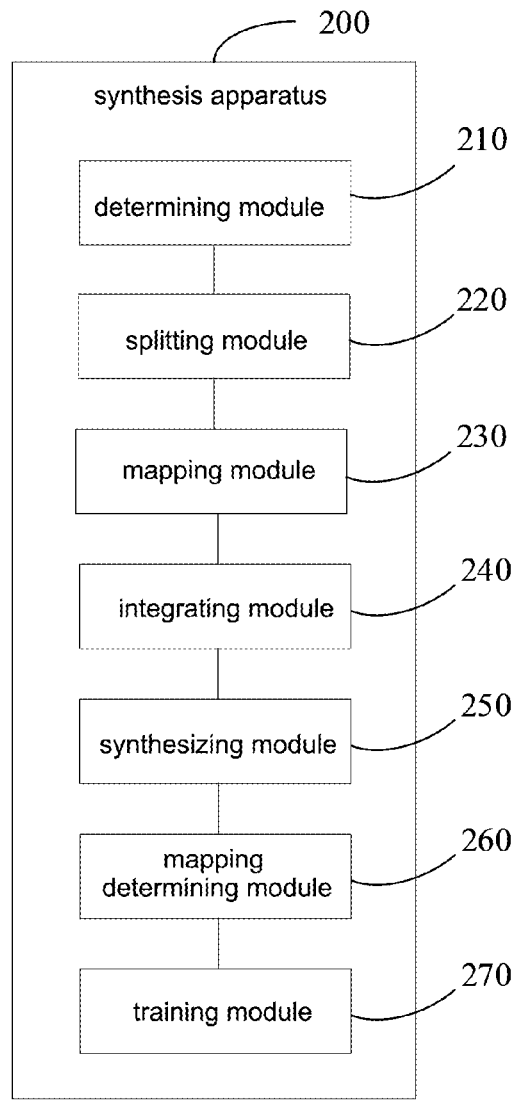
FIG. 3 shows a schematic structural diagram of the synthesis apparatus for emotion speech according to the embodiment of the present disclosure.

Please refer to FIG. 2 which is a schematic structural diagram of a synthesis apparatus for emotion speech according to an embodiment of the present disclosure and FIG. 3 which is another schematic structural diagram of the synthesis apparatus for emotion speech according to the embodiment of the present disclosure. As shown in FIG. 2, the synthesis apparatus 200 includes:

a determining module 210, configured to determine an original text, a target emotion, a target timbre, and an emotion timbre corresponding to a to-be-synthesized emotion speech;

a splitting module 220, configured to split the original text to obtain a collection of target syllables constituting the original text;

a mapping module 230, configured to perform mapping on each of the collection of target syllables based on the target emotion and the emotion timbre, so as to obtain a speech feature sequence of each target syllable, where the speech feature sequence includes at least one of a pronunciation duration, a pitch, or an energy;

an integrating module 240, configured to integrate the speech feature sequence of each of the collection of target syllables, so as to obtain a speech feature corresponding to the original text; and a synthesizing module 250, configured to synthesize the target emotion speech corresponding to the original text and having the target emotion and the target timbre, by utilizing the speech feature of the original text and the target timbre.

Further, the determining module 210, when configured to determine the original text, the target emotion, the target timbre, and the emotion timbre corresponding to the to-be-synthesized emotion speech, is configured to:

in response to an emotion speech synthesis instruction, acquire the original text, the target emotion and the target timbre corresponding to the to-be-synthesized emotion speech;

search a predetermined emotion speech library, and when the target emotion corresponds to one timbre, determine the corresponding timbre as the emotion timbre;

when the target emotion corresponds to a collection of timbres, perform semantic analysis on the original text by using a natural language processing technology, and determine an emotion intensity of an emotion contained in the original text; and screen out the timbre coincident with the emotion intensity from the collection of timbres corresponding to the target emotion, and take the timbre coincident with the emotion intensity as the emotion timbre, where the timbre being coincident with the emotion intensity means that in a collection of sample speeches included in the predetermined emotion speech library, an intensity of the target emotion contained in at least one sample speech corresponding to the timbre and having the target emotion is coincident with the emotion intensity.

Further, the mapping module 230, when configured to perform mapping on each of the collection of target syllables based on the target emotion and the emotion timbre to obtain the speech feature sequence of each target syllable, is configured to:

determine the speech feature sequence of each of the collection of target syllables mapped under the target emotion and the emotion timbre, based on a preset mapping relationship table.

Further, as shown in FIG. 3, the synthesis apparatus 200 further includes a mapping determining module 260, configured to determine the preset mapping relationship table by steps of:

acquiring a collection of sample speeches, with each sample speech being marked with an emotion mark and a timbre mark;

for each of the collection of sample speeches, determining a spectrum feature of each speech frame in the sample speech and a collection of sample syllables split from a sample text corresponding to the sample speech;

aligning the speech frames and the sample syllables, from a first speech frame of the sample speech and a first sample syllable corresponding to the sample speech, according to the spectrum features of the speech frames, so as to determine one or more speech frames corresponding to each sample syllable;

for each sample syllable, determining the pronunciation duration of the sample syllable based on the one or more speech frames corresponding to the sample syllable;

determining the pitch and the energy of the sample syllable according to an audio algorithm, based on the spectrum features of the one or more speech frames corresponding to the sample syllable;

determining the pronunciation duration, the pitch, and the energy corresponding to the sample syllable as the speech feature sequence of the sample syllable; and constructing the mapping relationship table for representing mapping relationships between syllables and the speech feature sequences under different emotions and different timbres, according to the speech feature sequence of each sample syllable in each sample speech, as well as the emotion mark and the timbre mark of each sample speech.

Further, the integrating module 240, when configured to integrate the speech feature sequences of the collection of target syllables to obtain the speech feature corresponding to the original text, is configured to:

for each target syllable, input the target syllable, the target emotion, and the speech feature sequence of the target syllable into a pre-trained speech feature processing model for feature fusion, so as to obtain a fusion speech feature of the target syllable;

determine a number of replications of the fusion speech feature of the target syllable according to the pronunciation duration of the target syllable, and replicate the fusion speech feature of the target syllable according to the number of replications, so as to obtain an intermediate speech feature of the target syllable; and integrate the intermediate speech feature of each of the target syllable of the original text, so as to obtain the speech feature corresponding to the original text.

Further, as shown in FIG. 3, the synthesis apparatus 200 further includes a training module 270, configured to train to obtain the speech feature processing model by steps of:

for the sample syllable corresponding to each of the collection of sample speeches, inputting the sample syllable, the emotion mark and the timbre mark of the sample speech, and the speech feature sequence of the sample syllable into an initial speech feature processing model, so as to obtain the fusion speech feature of the sample syllable;

determining a replication multiple of the fusion speech feature of the sample syllable according to the pronunciation duration of the sample syllable, and replicating the fusion speech feature of the sample syllable according to the replication multiple, so as to obtain the intermediate speech feature of the sample syllable;

integrating the intermediate speech feature of each sample syllable corresponding to the sample speech, so as to obtain the speech feature of the sample text corresponding to the sample speech;

performing timbre recognition on the speech feature of the sample text corresponding to the sample speech, and determining a timbre recognition result of the speech feature of the sample text corresponding to the sample speech;

adjusting model parameters of the initial speech feature processing model according to the determined timbre recognition result and the timbre mark of the sample speech, re-obtaining the speech feature of the sample text corresponding to the sample speech based on the initial speech feature processing model after parameter adjustment, and determining the timbre recognition result of the re-obtained speech feature; and repeating the above-mentioned steps until the determined timbre recognition result of the speech feature of the sample text corresponding to the sample speech is not coincident with the timbre mark, and obtaining the speech feature processing model.

Further, the mapping determining module 260, when configured to determine the pitch and the energy of the sample syllable according to the audio algorithm based on the spectrum features of the one or more speech frames corresponding to the sample syllable, is configured to:

for each of the collection of sample speeches, screen out at least one target sample speech with the same timbre mark as the sample speech from the collection of sample speeches, with the at least one target sample speech including the sample speech;

determine an original pitch of each speech frame of each of the at least one target sample speech according to the audio algorithm, based on the spectrum feature of the speech frame;

determine statistical data of the original pitch corresponding to the timbre mark of each target sample speech, based on the original pitch of each speech frame of the sample speech;

normalize an initial pitch of each speech frame of the sample speech, based on the statistical data of the original pitch, so as to obtain the pitch of each speech frame of the sample speech; and for each sample syllable corresponding to the sample speech, determine an average value of the pitches of the one or more speech frames corresponding to the sample syllable, and determine the average value as the pitch of the sample syllable.

The synthesis apparatus for emotion speech according to the embodiment of the present disclosure is configured to: determine the original text, the target emotion, the target timbre, and the emotion timbre corresponding to the to-be-synthesized emotion speech; split the original text to obtain the collection of target syllables of the original text; perform mapping on each of the collection of target syllables based on the target emotion and the emotion timbre, so as to obtain the speech feature sequence of each target syllable, with the speech feature sequence including at least one of the pronunciation duration, the pitch, or the energy; integrate the speech feature sequence of each of the collection of target syllables, so as to obtain the speech feature corresponding to the original text; and synthesize the target emotion speech corresponding to the original text and having the target emotion and the target timbre, by utilizing the speech feature of the original text and the target timbre.

With the synthesis apparatus, the speech feature of the original text can be determined according to the target emotion and the emotion timbre, and the target emotion speech can be synthesized based on the speech feature of the original text and the target timbre; in this way, when the speeches with different target timbres and different target emotions are required to be synthesized, it is not necessary to collect the speech data of different target emotions for each target timbre, and only the speech data of different target emotions for one or a few timbres is required to be collected, thus reducing the cost of the emotion speech synthesis, reducing the influence of the emotion expression capability of the speaker with the corresponding timbre on the speech quality, and improving the service experiences of the speech interaction.

Figure 4:
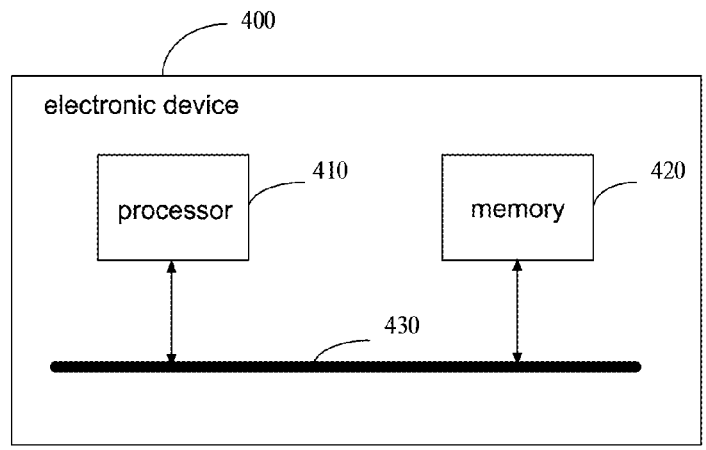
FIG. 4 shows a schematic structural diagram of an electronic device according to an embodiment of the present disclosure.

Please refer to FIG. 4 which is a schematic structural diagram of an electronic device according to an embodiment of the present disclosure. As shown in FIG. 4, the electronic device 400 includes a processor 410, a memory 420, and a bus 430.

The memory 420 stores machine-readable instructions executable by the processor 410, and when the electronic device runs a synthesis method for emotion speech according to the embodiment, the processor 410 and the memory 420 communicate with each other via the bus 430, the processor 410 executes the machine-readable instructions, and the processor 410 performs the preamble of the item of the method to perform steps of:

determining an original text, a target emotion, a target timbre, and an emotion timbre corresponding to a to-be-synthesized emotion speech;

splitting the original text to obtain a collection of target syllables constituting the original text;

performing mapping on each of the collection of target syllables based on the target emotion and the emotion timbre, so as to obtain a speech feature sequence of each target syllable, with the speech feature sequence including at least one of pronunciation a duration, a pitch, or an energy;

integrating the speech feature sequence of each of the collection of target syllables, so as to obtain a speech feature corresponding to the original text; and synthesizing the target emotion speech corresponding to the original text and having the target emotion and the target timbre, by utilizing the speech feature of the original text and the target timbre.

In some examples according to the present disclosure, the processor 410, when configured to execute the step of determining the original text, the target emotion, the target timbre, and the emotion timbre corresponding to the to-be-synthesized emotion speech, is configured to:

in response to an emotion speech synthesis instruction, acquire the original text, the target emotion and the target timbre corresponding to the to-be-synthesized emotion speech;

search a predetermined emotion speech library, and when the target emotion corresponds to one timbre, determine the corresponding timbre as the emotion timbre;

when the target emotion corresponds to a collection of timbres, perform semantic analysis on the original text by using a natural language processing technology, and determine an emotion intensity of an emotion contained in the original text; and screen out the timbre coincident with the emotion intensity from the collection of timbres corresponding to the target emotion, and take the timbre coincident with the emotion intensity as the emotion timbre, where the timbre being coincident with the emotion intensity means that in a collection of sample speeches included in the predetermined emotion speech library, an intensity of the target emotion contained in at least one sample speech corresponding to the timbre and having the target emotion is coincident with the emotion intensity.

In some examples according to the present disclosure, the processor 410, when configured to execute the step of performing mapping on each of the collection of target syllables based on the target emotion and the emotion timbre to obtain the speech feature sequence of each target syllable, is configured to:

determine the speech feature sequence of each of the collection of target syllables mapped under the target emotion and the emotion timbre, based on a preset mapping relationship table.

In some examples according to the present disclosure, the processor 410 is further configured to determine the preset mapping relationship table by executing steps of:

acquiring a collection of sample speeches, with each sample speech being marked with an emotion mark and a timbre mark;

for each of the collection of sample speeches, determining a spectrum feature of each speech frame in the sample speech and a collection of sample syllables split from a sample text corresponding to the sample speech;

aligning the speech frames and the sample syllables from a first speech frame of the sample speech and a first sample syllable corresponding to the sample speech according to the spectrum features of the speech frames, so as to determine one or more speech frames corresponding to each sample syllable;

for each sample syllable, determining the pronunciation duration of the sample syllable based on the one or more speech frames corresponding to the sample syllable;

determining the pitch and the energy of the sample syllable according to an audio algorithm, based on the spectrum features of the one or more speech frames corresponding to the sample syllable;

determining the pronunciation duration, the pitch, and the energy corresponding to the sample syllable as the speech feature sequence of the sample syllable; and constructing the mapping relationship table for representing mapping relationships between syllables and the speech feature sequences under different emotions and different timbres, according to the speech feature sequence of each sample syllable in each sample speech, as well as the emotion mark and the timbre mark of each sample speech.

In some examples according to the present disclosure, the processor 410, when configured to execute the step of integrating the speech feature sequence of each of the collection of target syllables so as to obtain the speech feature corresponding to the original text, is configured to:

for each target syllable, input the target syllable, the target emotion, and the speech feature sequence of the target syllable into a pre-trained speech feature processing model for feature fusion, so as to obtain a fusion speech feature of the target syllable;

determine a number of replications of the fusion speech feature of the target syllable according to the pronunciation duration of the target syllable, and replicate the fusion speech feature of the target syllable according to the number of replications, so as to obtain an intermediate speech feature of the target syllable; and integrate the intermediate speech feature of each of the target syllable of the original text, so as to obtain the speech feature corresponding to the original text.

In some examples according to the present disclosure, the processor 410 is further configured to train to obtain the speech feature processing model by executing steps of:

for the sample syllable corresponding to each of the collection of sample speeches, inputting the sample syllable, the emotion mark and the timbre mark of the sample speech and the speech feature sequence of the sample syllable into an initial speech feature processing model, so as to obtain the fusion speech feature of the sample syllable;

determining a replication multiple of the fusion speech feature of the sample syllable according to the pronunciation duration of the sample syllable, and replicate the fusion speech feature of the sample syllable according to the replication multiple, so as to obtain the intermediate speech feature of the sample syllable;

integrating the intermediate speech features of the sample syllables corresponding to the sample speech to obtain the speech feature of the sample text corresponding to the sample speech;

performing timbre recognition on the speech feature of the sample text corresponding to the sample speech, and determining a timbre recognition result of the speech feature of the sample text corresponding to the sample speech;

adjusting model parameters of the initial speech feature processing model according to the determined timbre recognition result and the timbre mark of the sample speech, re-obtaining the speech feature of the sample text corresponding to the sample speech based on the initial speech feature processing model after parameter adjustment, and determining the timbre recognition result of the re-obtained speech feature; and repeating the above-mentioned steps until the determined timbre recognition result of the speech feature of the sample text corresponding to the sample speech is not coincident with the timbre mark, and obtaining the speech feature processing model.

In some examples according to the present disclosure, the processor 410, when configured to execute the step of determining the pitch and the energy of the sample syllable according to the audio algorithm based on the spectrum features of the one or more speech frames corresponding to the sample syllable, is configured to:

for each of the collection of sample speeches, screen out at least one target sample speech with the same timbre mark as the sample speech from the collection of sample speeches, with the at least one target sample speech including the sample speech;

determine an original pitch of each speech frame of each of the at least one target sample speech according to the audio algorithm based on the spectrum feature of the speech frame;

determine statistical data of the original pitch corresponding to the timbre mark of each target sample speech based on the original pitch of each speech frame of the sample speech;

normalize an initial pitch of each speech frame of the sample speech based on the statistical data of the original pitch, so as to obtain the pitch of each speech frame of the sample speech; and for each sample syllable corresponding to the sample speech, determine an average value of the pitches of the one or more speech frames corresponding to the sample syllable, and determine the average value as the pitch of the sample syllable.

In the above way, the speech feature of the original text can be determined according to the target emotion and the emotion timbre, and the target emotion speech can be synthesized based on the speech feature of the original text and the target timbre; in this way, when the speeches with different target timbres and different target emotions are required to be synthesized, it is not necessary to collect the speech data of different target emotions for each target timbre, and only the speech data of different target emotions for one or a few timbres is required to be collected, thus reducing the cost of the emotion speech synthesis, reducing the influence of the emotion expression capability of the speaker with the corresponding timbre on the speech quality, and improving the service experiences of the speech interaction.

An embodiment of the present disclosure further provides a computer-readable storage medium, storing a computer program thereon, and when the computer program is executed by a processor, the processor performs steps of:

determining an original text, a target emotion, a target timbre, and an emotion timbre corresponding to a to-be-synthesized emotion speech;

splitting the original text to obtain a collection of target syllables constituting the original text;

performing mapping on each of the collection of target syllables based on the target emotion and the emotion timbre, so as to obtain a speech feature sequence of each target syllable, with the speech feature sequence including at least one of a pronunciation duration, a pitch, or an energy;

integrating the speech feature sequence of the collection of target syllables, so as to obtain a speech feature corresponding to the original text; and synthesizing the target emotion speech corresponding to the original text and having the target emotion and the target timbre, by utilizing the speech feature of the original text and the target timbre.

In some examples according to the present disclosure, the processor, when configured to execute the step of determining the original text, the target emotion, the target timbre, and the emotion timbre corresponding to the to-be-synthesized emotion speech, is configured to:

in response to an emotion speech synthesis instruction, acquire the original text, the target emotion and the target timbre corresponding to the to-be-synthesized emotion speech;

search a predetermined emotion speech library, and when the target emotion corresponds to one timbre, determine the corresponding timbre as the emotion timbre;

when the target emotion corresponds to a collection of timbres, perform semantic analysis on the original text by using a natural language processing technology, so as to determine an emotion intensity of an emotion contained in the original text; and screen out the timbre coincident with the emotion intensity from the collection of timbres corresponding to the target emotion, and take the timbre coincident with the emotion intensity as the emotion timbre, where the timbre being coincident with the emotion intensity means that in a collection of sample speeches included in the predetermined emotion speech library, an intensity of the target emotion contained in at least one sample speech corresponding to the timbre and having the target emotion is coincident with the emotion intensity.

In some examples according to the present disclosure, the processor, when configured to execute the step of performing mapping on each of the collection of target syllables based on the target emotion and the emotion timbre so as to obtain the speech feature sequence of each target syllable, is configured to:

determine the speech feature sequence of each of the collection of target syllables mapped under the target emotion and the emotion timbre, based on a preset mapping relationship table.

In some examples according to the present disclosure, the processor is further configured to determine the preset mapping relationship table by executing steps of:

acquiring a collection of sample speeches, with each sample speech being marked with an emotion mark and a timbre mark;

for each of the collection of sample speeches, determining a spectrum feature of each speech frame in the sample speech and a collection of sample syllables split from a sample text corresponding to the sample speech;

aligning the speech frames and the sample syllables, from a first speech frame of the sample speech and a first sample syllable corresponding to the sample speech, according to the spectrum features of the speech frames, so as to determine one or more speech frames corresponding to each sample syllable;

for each sample syllable, determining the pronunciation duration of the sample syllable based on the one or more speech frames corresponding to the sample syllable;

determining the pitch and the energy of the sample syllable according to an audio algorithm, based on the spectrum features of the one or more speech frames corresponding to the sample syllable;

determining the pronunciation duration, the pitch, and the energy corresponding to the sample syllable as the speech feature sequence of the sample syllable; and constructing the mapping relationship table for representing mapping relationships between syllables and the speech feature sequences under different emotions and different timbres, according to the speech feature sequence of each sample syllable in each sample speech, as well as the emotion mark and the timbre mark of each sample speech.

In some examples according to the present disclosure, the processor, when configured to execute the step of integrating the speech feature sequences of the collection of target syllables so as to obtain the speech feature corresponding to the original text, is configured to:

for each target syllable, input the target syllable, the target emotion, and the speech feature sequence of the target syllable into a pre-trained speech feature processing model for feature fusion, so as to obtain a fusion speech feature of the target syllable;

determine a number of replications of the fusion speech feature of the target syllable according to the pronunciation duration of the target syllable, and replicating the fusion speech feature of the target syllable according to the number of replications, so as to obtain an intermediate speech feature of the target syllable; and integrate the intermediate speech feature of each target syllable of the original text, so as to obtain the speech feature corresponding to the original text.

In some examples according to the present disclosure, the processor is further configured to train to obtain the speech feature processing model by executing steps of:

for the sample syllable corresponding to each of the collection of sample speeches, inputting the sample syllable, the emotion mark and the timbre mark of the sample speech and the speech feature sequence of the sample syllable into an initial speech feature processing model, so as to obtain the fusion speech feature of the sample syllable;

determining a replication multiple of the fusion speech feature of the sample syllable according to the pronunciation duration of the sample syllable, and replicating the fusion speech feature of the sample syllable according to the replication multiple, so as to obtain the intermediate speech feature of the sample syllable;

integrating the intermediate speech feature of each sample syllable corresponding to the sample speech, so as to obtain the speech feature of the sample text corresponding to the sample speech;

performing timbre recognition on the speech feature of the sample text corresponding to the sample speech, and determining a timbre recognition result of the speech feature of the sample text corresponding to the sample speech;

adjusting model parameters of the initial speech feature processing model according to the determined timbre recognition result and the timbre mark of the sample speech, re-obtaining the speech feature of the sample text corresponding to the sample speech based on the initial speech feature processing model after parameter adjustment, and determining the timbre recognition result of the re-obtained speech feature; and repeating the above-mentioned steps until the determined timbre recognition result of the speech feature of the sample text corresponding to the sample speech is not coincident with the timbre mark, and obtaining the speech feature processing model.

In some examples according to the present disclosure, the processor, when configured to execute the step of determining the pitch and the energy of the sample syllable according to the audio algorithm based on the spectrum features of the one or more speech frames corresponding to the sample syllable, is configured to:

for each of the collection of sample speeches, screen out at least one target sample speech with the same timbre mark as the sample speech from the collection of sample speeches, with the at least one target sample speech including the sample speech;

determine an original pitch of each speech frame of each of the at least one target sample speech according to the audio algorithm based on the spectrum feature of the speech frame;

determine statistical data of the original pitch corresponding to the timbre mark of each target sample speech based on the original pitch of each speech frame of the sample speech;

normalize an initial pitch of each speech frame of the sample speech based on the statistical data of the original pitch, so as to obtain the pitch of each speech frame of the sample speech; and for each sample syllable corresponding to the sample speech, determine an average value of the pitches of the one or more speech frames corresponding to the sample syllable, and determine the average value as the pitch of the sample syllable.

In the above way, the speech feature of the original text can be determined according to the target emotion and the emotion timbre, and the target emotion speech can be synthesized based on the speech feature of the original text and the target timbre; in this way, when the speeches with different target timbres and different target emotions are required to be synthesized, it is not necessary to collect the speech data of different target emotions for each target timbre, and only the speech data of different target emotions for one or a few timbres is required to be collected, thus reducing the cost of the emotion speech synthesis, reducing the influence of the emotion expression capability of the speaker with the corresponding timbre on the speech quality, and improving the service experiences of the speech interaction.

It may be clearly understood by persons skilled in the art that, for the convenience and brevity of description, for a detailed working process of the foregoing system, apparatus, and unit, reference may be made to a corresponding process in the foregoing method embodiments, and details are not repeated herein.

In several embodiments provided in the present disclosure, it should be understood that the disclosed system, apparatus, and method may be implemented in other manners. The described apparatus embodiment is only illustrative. For example, the division of the units is only a logical function division, and there may be other division method in actual implementation. For another example, a collection of units or components may be combined or integrated into another system, or some features may be ignored or not performed. In addition, the displayed or discussed mutual couplings or direct couplings or communication connections may be indirect couplings or communication connections through some communication interfaces, apparatus, or units, and may be implemented in electronic, mechanical or other forms.

The units described as separate parts may or may not be physically separate, and the parts displayed as units may or may not be physical units, that is, may be located in one position, or may be distributed on a collection of network units. A part or all of the units may be selected according to an actual need to achieve the objectives of the embodiments.

In addition, functional units in the embodiments of the present disclosure may be integrated into one processing unit, or each of the units may exist alone physically, or two or more units are integrated into one unit.

When the functional unit is implemented in the form of a software functional unit and sold or used as an independent product, it may be stored in a non-volatile computer-readable storage medium executable by a processor. Based on such an understanding, the embodiments of the present disclosure essentially, or the part contributing to the related art, or a part of the embodiments may be implemented in the form of a software product. The computer software product is stored in a storage medium and includes several instructions for instructing a computer device (which may be a personal computer, a server, or a network device) to perform all or a part of steps of the method described in the embodiment of the present disclosure. The foregoing storage medium includes: a U disk, a removable hard disk, a read-only memory (ROM), a random access memory (RAM), a magnetic disk, an optical disk, or any medium that may store program codes.

Finally, it should be noted that the above embodiments are only used to illustrate the examples of the present disclosure, but not to limit them, and the protection scope of the present disclosure is not limited thereto; although the present disclosure is described in detail with reference to the above embodiments, those ordinary skilled in the art should understand that any person familiar with the art still can modify examples recited in the aforesaid embodiments or easily envisage changes or equivalently replace partial technical features therein within the technical scope of the present disclosure; these modifications, changes or substitutions do not make essence of corresponding embodiments depart from the spirit and scope of the embodiments of the present disclosure, and are intended to be covered by the protection scope of the present disclosure. Therefore, the protection scope of the present disclosure shall be subject to the protection scope of the claims.

What is claimed is:

1. A synthesis method for emotion speech, comprising:

determining, by a terminal, an original text, a target emotion, a target timbre, and an emotion timbre corresponding to a to-be-synthesized emotion speech;

splitting the original text to obtain a plurality of target syllables constituting the original text;

performing mapping on each of the plurality of target syllables based on the target emotion and the emotion timbre to obtain a speech feature sequence of each target syllable, wherein the speech feature sequence comprises at least one of a pronunciation duration, a pitch, or an energy;

integrating, by the terminal, the speech feature sequence of each of the plurality of target syllables to obtain a speech feature corresponding to the original text; and synthesizing, by the terminal, emotion speech with the target emotion corresponding to the original text and having the target emotion and the target timbre, by using the speech feature of the original text and the target timbre.

2. The synthesis method according to claim 1, wherein determining the original text, the target emotion, the target timbre, and the emotion timbre corresponding to the to-be-synthesized emotion speech, further comprises:
in response to receiving an emotion speech synthesis instruction, acquiring the original text, the target emotion and the target timbre corresponding to the to-be-synthesized emotion speech;
searching a predetermined emotion speech library;
in response to determining that the target emotion corresponds to one timbre, determining a corresponding timbre as the emotion timbre;
in response to determining that the target emotion corresponds to a plurality of timbres, performing semantic analysis on the original text by using a natural language processing technology, to determine an emotion intensity of an emotion contained in the original text; and
screening out the timbre coincident with the emotion intensity, from the plurality of timbres corresponding to the target emotion, and taking the timbre coincident with the emotion intensity as the emotion timbre, wherein that the timbre is coincident with the emotion intensity means that, in a plurality of sample speeches comprised in the predetermined emotion speech library, the target emotion, which is contained in at least one sample speech corresponding to the timbre and having the target emotion, has an intensity coincident with the emotion intensity.

3. The synthesis method according to claim 2, wherein in response to determining that the predetermined emotion speech library is constructed, the intensity of the target emotion contained in the at least one sample speech corresponding to the timbre and having the target emotion is determined by performing speech analysis or manual marking on the sample speech.

4. The synthesis method according to claim 1, wherein the target emotion corresponds to a plurality of timbres, and wherein the plurality of timbres corresponding to the target emotion are provided to a user for selection, such that the emotion timbre is determined in response to a selection operation of the user.

5. The synthesis method according to claim 1, wherein a splitting the original text to obtain the plurality of target syllables constituting the original text is implemented by presetting a dictionary.

6. The synthesis method according to claim 1, wherein performing mapping on each of the plurality of target syllables based on the target emotion and the emotion timbre to obtain the speech feature sequence of each target syllable further comprises:
determining the speech feature sequence of each of the plurality of target syllables mapped under the target emotion and the emotion timbre, based on a preset mapping relationship table.

7. The synthesis method according to claim 6, wherein the preset mapping relationship table is determined by steps of:
acquiring a plurality of sample speeches, wherein each sample speech is marked with an emotion mark and a timbre mark;
for each sample speech in the plurality of sample speeches, determining one or more spectrum features of each speech frame in the sample speech, and a plurality of sample syllables split from a sample text corresponding to the sample speech;
aligning the speech frames and the plurality of sample syllables, from a first speech frame of the sample speech and a first sample syllable corresponding to the sample speech, according to the one or more spectrum features of the speech frames, to determine one or more speech frames corresponding to each sample syllable in the plurality of sample syllables;
for each sample syllable in the plurality of sample syllables, determining the pronunciation duration of the sample syllable based on the one or more speech frames corresponding to the sample syllable;
determining the pitch and the energy of the sample syllable according to an audio algorithm, based on the one or more spectrum features of the one or more speech frames corresponding to the sample syllable;
determining the pronunciation duration, the pitch, or the energy corresponding to the sample syllable as the speech feature sequence of the sample syllable; and
constructing the mapping relationship table for representing mapping relationships between syllables and the speech feature sequences under different emotions and different timbres, according to the speech feature sequence of each sample syllable in each sample speech, the emotion mark and the timbre mark of each sample speech.

8. The synthesis method according to claim 7, wherein integrating the speech feature sequence of each of the plurality of target syllables to obtain the speech feature corresponding to the original text further comprises:
for each target syllable, inputting the target syllable, the target emotion, and the speech feature sequence of the target syllable into a pre-trained speech feature processing model for feature fusion, to obtain a fusion speech feature of the target syllable;
determining number of replications of the fusion speech feature of the target syllable according to the pronunciation duration of the target syllable, and replicating the fusion speech feature of the target syllable according to the number of replications, to obtain an intermediate speech feature of the target syllable; and
integrating the intermediate speech feature of each target syllable of the original text, to obtain the speech feature corresponding to the original text.

9. The synthesis method according to claim 8, wherein the speech feature processing model is trained by steps of:
for the sample syllable corresponding to each of the plurality of sample speeches, inputting the sample syllable, the emotion mark and the timbre mark of the sample speech, and the speech feature sequence of the sample syllable into an initial speech feature processing model, to obtain the fusion speech feature of the sample syllable;
determining a replication multiple of the fusion speech feature of the sample syllable according to the pronunciation duration of the sample syllable, and replicating the fusion speech feature of the sample syllable according to the replication multiple, to obtain the intermediate speech feature of the sample syllable;
integrating the intermediate speech feature of each sample syllable corresponding to the sample speech, to obtain the speech feature of the sample text corresponding to the sample speech;
performing timbre recognition on the speech feature of the sample text corresponding to the sample speech, and determining a timbre recognition result of the speech feature of the sample text corresponding to the sample speech;

adjusting model parameters of the initial speech feature processing model, according to the determined timbre recognition result and the timbre mark of the sample speech, re-obtaining the speech feature of the sample text corresponding to the sample speech based on the initial speech feature processing model after parameter adjustment, and determining the timbre recognition result of the re-obtained speech feature; and repeating the inputting, determining, integrating, performing, and adjusting steps until the determined timbre recognition result of the speech feature of the sample text corresponding to the sample speech is not coincident with the timbre mark, and obtaining the speech feature processing model.

10. The synthesis method according to claim 7, wherein determining the pitch and the energy of the sample syllable further comprises:

for each of the plurality of sample speeches, screening out at least one target sample speech with a same timbre mark as the sample speech, from the plurality of sample speeches, wherein the at least one target sample speech comprises the sample speech;

determining an original pitch of each speech frame of each of the at least one target sample speech according to the audio algorithm, based on the spectrum feature of the speech frame;

determining statistical data of the original pitch corresponding to the timbre mark of each target sample speech, based on the original pitch of each speech frame of the sample speech;

normalizing an initial pitch of each speech frame of the sample speech, based on the statistical data of the original pitch, to obtain the pitch of each speech frame of the sample speech; and for each sample syllable corresponding to the sample speech, determining an average value of the pitches of the one or more speech frames corresponding to the sample syllable, and determining the average value as the pitch of the sample syllable.

11. The synthesis method according to claim 6, wherein the mapping relationship table is implemented by means of machine learning, and wherein a network model is trained by using sample speeches, such that the network model learns the mapping relationship between syllables and the speech feature sequences under different emotions and different timbres.

12. An electronic device, comprising: a processor, a memory, and a bus, wherein the memory stores machine-readable instructions executable by the processor, wherein when the electronic device is running, the processor and the memory communicate with each other via the bus, and the machine-readable instructions, when executed by the processor, performs steps of a synthesis method, with the synthesis method comprising:

determining an original text, a target emotion, a target timbre, and an emotion timbre corresponding to a to-be-synthesized emotion speech;

splitting the original text to obtain a plurality of target syllables constituting the original text;

performing mapping on each of the plurality of target syllables based on the target emotion and the emotion timbre to obtain a speech feature sequence of each target syllable, wherein the speech feature sequence comprises at least one of a pronunciation duration, a pitch, or an energy;

integrating the speech feature sequence of each of the plurality of target syllables to obtain a speech feature corresponding to the original text; and synthesizing the target emotion speech corresponding to the original text and having the target emotion and the target timbre, by using the speech feature of the original text and the target timbre.

13. The electronic device according to claim 12, wherein performing mapping on each of the plurality of target syllables based on the target emotion and the emotion timbre to obtain the speech feature sequence of each target syllable further comprises:

determining the speech feature sequence of each of the plurality of target syllables mapped under the target emotion and the emotion timbre, based on a preset mapping relationship table.

14. The electronic device according to claim 13, wherein the preset mapping relationship table is determined by steps of:

acquiring a plurality of sample speeches, wherein each sample speech is marked with an emotion mark and a timbre mark;

for each of the plurality of sample speeches, determining a spectrum feature of each speech frame in the sample speech, and a plurality of sample syllables split from a sample text corresponding to the sample speech;

aligning the speech frames and the sample syllables, from a first speech frame of the sample speech and a first sample syllable corresponding to the sample speech, according to the spectrum features of the speech frames to determine one or more speech frames corresponding to each sample syllable;

for each sample syllable, determining the pronunciation duration of the sample syllable based on the one or more speech frames corresponding to the sample syllable;

determining the pitch and the energy of the sample syllable according to an audio algorithm, based on the spectrum features of the one or more speech frames corresponding to the sample syllable;

determining the pronunciation duration, the pitch, or the energy corresponding to the sample syllable as the speech feature sequence of the sample syllable; and constructing the mapping relationship table for representing mapping relationships between syllables and the speech feature sequences under different emotions and different timbres, according to the speech feature sequence of each sample syllable in each sample speech, the emotion mark and the timbre mark of each sample speech.

15. The electronic device according to claim 14, wherein integrating the speech feature sequence of each of the plurality of target syllables to obtain the speech feature corresponding to the original text further comprises:

for each target syllable, inputting the target syllable, the target emotion, and the speech feature sequence of the target syllable into a pre-trained speech feature processing model for feature fusion to obtain a fusion speech feature of the target syllable;

determining number of replications of the fusion speech feature of the target syllable according to the pronunciation duration of the target syllable, and replicating the fusion speech feature of the target syllable according to the number of replications to obtain an intermediate speech feature of the target syllable; and integrating the intermediate speech feature of each target syllable of the original text to obtain the speech feature corresponding to the original text.

16. A non-transitory computer-readable storage medium, storing a computer program thereon, wherein the computer program, when executed by a processor, performs steps of a synthesis method, with the synthesis method comprising:
determining an original text, a target emotion, a target timbre, and an emotion timbre corresponding to a to-be-synthesized emotion speech;
splitting the original text to obtain a plurality of target syllables constituting the original text;
performing mapping on each of the plurality of target syllables based on the target emotion and the emotion timbre to obtain a speech feature sequence of each target syllable, wherein the speech feature sequence comprises at least one of a pronunciation duration, a pitch, or an energy;
integrating the speech feature sequence of each of the plurality of target syllables to obtain a speech feature corresponding to the original text; and
synthesizing the target emotion speech corresponding to the original text and having the target emotion and the target timbre, by using the speech feature of the original text and the target timbre.

17. The non-transitory computer-readable storage medium according to claim 16, wherein determining the original text, the target emotion, the target timbre, and the emotion timbre corresponding to the to-be-synthesized emotion speech further comprises:
in response to an emotion speech synthesis instruction, acquiring the original text, the target emotion and the target timbre corresponding to the to-be-synthesized emotion speech;
searching a predetermined emotion speech library;
in response to determining that the target emotion corresponds to one timbre, determining the corresponding timbre as the emotion timbre;
in response to determining that the target emotion corresponds to a plurality of timbres, performing semantic analysis on the original text by using a natural language processing technology, to determine an emotion intensity of an emotion contained in the original text; and
screening out the timbre coincident with the emotion intensity, from the plurality of timbres corresponding to the target emotion, and taking the timbre coincident with the emotion intensity as the emotion timbre, wherein that the timbre is coincident with the emotion intensity means that, in a plurality of sample speeches comprised in the predetermined emotion speech library, the target emotion, which is contained in at least one sample speech corresponding to the timbre and having the target emotion, has an intensity coincident with the emotion intensity.

18. The non-transitory computer-readable storage medium according to claim 16, wherein performing mapping on each of the plurality of target syllables based on the target emotion and the emotion timbre to obtain the speech feature sequence of each target syllable further comprises:
determining the speech feature sequence of each of the plurality of target syllables mapped under the target emotion and the emotion timbre, based on a preset mapping relationship table.

19. The non-transitory computer-readable storage medium according to claim 18, wherein the preset mapping relationship table is determined by steps of:
acquiring a plurality of sample speeches, wherein each sample speech is marked with an emotion mark and a timbre mark;
for each sample speech in the plurality of sample speeches, determining one or more spectrum features of each speech frame in the sample speech, and a plurality of sample syllables split from a sample text corresponding to the sample speech;
aligning the speech frames and the plurality of sample syllables, from a first speech frame of the sample speech and a first sample syllable corresponding to the sample speech, according to the one or more spectrum features of the speech frames to determine one or more speech frames corresponding to each sample syllable in the plurality of sample syllables;
for each sample syllable in the plurality of sample syllables, determining the pronunciation duration of the sample syllable based on the one or more speech frames corresponding to the sample syllable;
determining the pitch and the energy of the sample syllable according to an audio algorithm, based on the one or more spectrum features of the one or more speech frames corresponding to the sample syllable;
determining the pronunciation duration, the pitch, or the energy corresponding to the sample syllable as the speech feature sequence of the sample syllable; and
constructing the mapping relationship table for representing mapping relationships between syllables and the speech feature sequences under different emotions and different timbres, according to the speech feature sequence of each sample syllable in each sample speech, the emotion mark and the timbre mark of each sample speech.

20. The non-transitory computer-readable storage medium according to claim 19, wherein determining the pitch and the energy of the sample syllable further comprises:
for each of the plurality of sample speeches, screening out at least one target sample speech with a same timbre mark as the sample speech, from the plurality of sample speeches, wherein the at least one target sample speech comprises the sample speech;
determining an original pitch of each speech frame of each of the at least one target sample speech according to the audio algorithm, based on the spectrum feature of the speech frame;
determining statistical data of the original pitch corresponding to the timbre mark of each target sample speech, based on the original pitch of each speech frame of the sample speech;
normalizing an initial pitch of each speech frame of the sample speech, based on the statistical data of the original pitch to obtain the pitch of each speech frame of the sample speech; and
for each sample syllable corresponding to the sample speech, determining an average value of the pitches of the one or more speech frames corresponding to the sample syllable, and determining the average value as the pitch of the sample syllable.

* * * * *